United States Patent Office 2,830,965
Patented Apr. 15, 1958

2,830,965

RESIN SOLUTIONS SUITABLE FOR PRODUCING BAKABLE COATINGS

Gustav Heinrich Ott, Arlesheim, near Basel, Switzerland, assignor to Ciba Limited, Basel, Switzerland, a Swiss firm No Drawing. Application December 21, 1953
Serial No. 399,586

Claims priority, application Switzerland
December 22, 1952

11 Claims. (Cl. 260—44)

Patent No. 2,637,715 describes resin solutions suitable as raw materials for making lacquers which are bakable at high temperatures and yield very heat resistant coatings. These resin solutions are obtained by heating a resinous polyhydric phenol derivative containing at least two ethylene oxide groups in the presence of a solvent with a polybasic carboxylic acid of which the carboxyl groups are separated from one another by at least two carbon atoms, or an anhydride of such acid, and with dicyandiamide.

The resin solutions so obtained may also be heated with an aldehyde condensation product containing etherified methylol groups and derived from a substance capable of forming a hardenable condensate with formaldehyde, in which case a further quantity of dicyandiamide is added.

Coatings produced with such resin solutions on metals exhibit, after baking, a high resistance to heat and good mechanical and chemical properties, but they easily tend to form so-called hair-like cracks. By the formation of hair-like cracks is meant an accumulation of cracks due to mechanical stress in a lacquer coating which are formed when the lacquer comes into contact with water or an organic solvent, for example, alcohol, or when the lacquered article is flexed in a damp atmosphere under tensile stress. The phenomenon of the formation of hair-like cracks, to which most synthetic baking lacquers, and especially the otherwise valuable acetal lacquers or polyvinyl formal enamels, are prone, can very seriously impair the insulation resistance of a wound body, for example, a coil or a rotor.

The present invention provides resin solutions which, when baked at high temperatures, yield very heat resistant coatings free from hair-like cracks, and which solutions comprise a mixture of (A) a solution obtained by heating in the presence of a solvent free from carboxyl groups, a resinous polyhydric phenol derivative containing at least two ethylene oxide groups, a polybasic carboxylic acid or anhydride thereof of which the carboxyl groups are separated from one another by at least two carbon atoms, and dicyandiamide, (B) a polyester containing free hydroxyl groups and prepared from a polyhydric alcohol and a polybasic carboxylic acid or anhydride thereof of which the carboxyl groups are separated from one another by at least two carbon atoms and (C) a hardenable formaldehyde condensation product of a substance capable of forming a hardenable condensate with formaldehyde.

When making component (A), the quantitative proportions to be used between the resinous polyhydric phenol derivative containing at least two ethylene oxide groups, the polybasic carboxylic acid or the anhydride thereof and the dicyandiamide may be varied within relatively wide limits. It has proved to be of advantage to employ the quantitative proportions mentioned in Patent No. 2,637,715, i. e. from ⅛ to at most ⅚ of one equivalent of the polybasic carboxylic acid or the anhydride thereof and about 0.06 to 0.6 mol of dicyandiamide, calculated on a quantity of the ethylene oxide derivative which contains one mol bound polyhydric phenol. In this specification, one equivalent of the polybasic carboxylic acid means the quantity corresponding to its molecular weight divided by the number of the carboxyl groups present in one molecule of said acid.

As mixtures of (A), (B) and (C) there are included in the invention heated mixtures of (A), (B) and (C) and also mixtures which are obtainable by heating two of the aforesaid components in the presence of a solvent and mixing the resulting solution with the third component.

The resinous polyhydric phenol derivatives containing at least two ethylene oxide groups, which are used as starting materials, can be obtained in known manner by the action of an epi-halogen hydrin or dihalogen hydrin on an appropriate phenol in an alkaline medium.

As phenols there come into consideration those which contain at least two hydroxyl groups. Especially useful are polyhydric polynuclear phenols of which the phenol nuclei are bound together by carbon bridges as in the case, for example, of 4:4'-dihydroxydiphenyl-dimethyl-methane and the like.

In admixture with the aforesaid polynuclear phenols there may be used polynuclear phenols of which the phenol nuclei are bound together by sulfur bridges as in the case, for example, of 4:4'-dihydroxy-diphenyl sulfone.

It is also possible to use for preparing the ethylene oxide derivatives other polyhydric phenols, for example, resorcinol, hydroquinone, ortho:ortho'-biphenol and the like. There may also be used certain resinous phenolaldehyde condensation products of the type of novolaks.

As polybasic carboxylic acids and carboxylic acid anhydrides, which may be used for preparing the solution (A) or the polyester (B), there come into consideration aliphatic and cyclic carboxylic acids or anhydrides of which the carboxyl groups are separated from one another by at least two carbon atoms such, for example, as maleic acid, succinic acid, adipic acid, citric acid, sebacic acid, phthalic acid, maleic anhydride, succinic anhydride, phthalic anhydride and the like or mixtures thereof.

As polyhydric alcohols, which are used for preparing the polyesters (B), there may be mentioned, for example, glycerine, penta-erythritol, ethylene glycol, trimethylol-propane or the like, and also mixtures of these substances. The polyesters can be obtained in known manner by heating the polyhydric alcohol with the polybasic carboxylic acid. The relative proportions must be so chosen that the esterification product still contains free hydroxyl groups. Advantageously, the esterification is continued until the acid number of the polyester obtained is as small as possible.

As substances capable of forming hardenable condensation products with formaldehyde there may be used for example: a urea, dicyandiamide, an aminotriazine containing at least two $NH_2$ groups, such as melamine, benzoguanamine or the like, phenol or a phenol which contains an aliphatic hydrocarbon radical and is free from other substituents, such as cresols or para-tertiary butylphenol.

As often in the art, the expression "hardenable formaldehyde condensation products" of the aforementioned substances is here intended to comprise, not only hardenable condensation products obtained from formaldehyde and said substances, but also etherified derivatives of these condensation products obtainable in known manner, for instance, by reacting an alcohol with said condensation products or by simultaneously reacting the alcohol with the components of the condensation products.

As suitable solvents free from carboxyl groups there come into considerations, for example, members of the following groups: Alcohols, ketones, hydrocarbons, chlorinated hydrocarbons, esters, ethers, glycol ethers, phenols or the like, which are advantageously used in the form of mixtures of at least two such solvents. The best choice of solvent with regard to boiling point and speed of evaporation to make in any particular case will be well understood by those skilled in the art.

For preparing the resin solutions of this invention a solution of the reaction product (A) may be mixed with the polyester (B) and the formaldehyde condensation product (C), advantageously in the presence of a further solvent in any desired order of succession. Such a mixture, after being applied, for example to a metallic support, yields open baking coatings which are free from hair-like cracks.

It is of advantage first to condense by the action of heat a polyester (B) with a formaldehyde condensation product (C), if desired, with the addition of a suitable solvent, and then to mix the modified polyester so obtained with the solution of the reaction product (A), and, if desired, further to heat the resulting mixture.

The relative proportions in which the components (A), (B) and (C) are used may vary within relatively wide limits, and depends on the choice of the components. An expert will have no difficulty in determining the appropriate proportions in any particular case by simple tests.

The mechanical and chemical properties of the coatings free from hair-like cracks produced with the resin solutions of the invention can be widely varied depending on the requirements to be fulfilled by the coating, by incorporating with the resin solution additional film-forming raw materials for lacquers, insofar as they are compatible with the resin solution. As such additional raw materials for lacquers there may be mentioned, for example, polyvinyl acetals, polyamides and the like, or the above mentioned aldehyde condensation products (C) or polyester resins. There may also be used mixtures of such additional lacquer materials. Thus, the use of hardenable resins as additional lacquer materials enhances the surface hardness of the coatings produced, whereas their extensibility is reduced. Polyvinyl acetals increase the viscosity of the resin solution and usually improve the resistance to solvents and the abrasion resistance of the coatings, and polyamides merely increase the abrasion resistance. The lacquer solutions may also contain coloring matters, advantageously those which are stable at the high temperature used for baking.

Metallic driers, for example, a lead drier, in the form of resinates, naphthenates and the like, accelerate hardening and also improve the dielectric properties of the coatings.

When polyisocyanates, of which the isocyanate groups are stabilized in known manner, for example, with phenols, namely the so-called masked isocyanates, are incorporated with the resin solutions of the invention, the coatings obtained with such resin solutions are distinguished by an unexpectedly high specific electric resistance and, even in the case of coatings on wire which has been stored in a moist atmosphere, by unexpectedly small dielectric losses (tg. δ).

It is therefore possible for an expert to adapt the resin solutions of the invention in the manner referred to above to the purposes for which they are to be used. It must, however, be borne in mind that the use of additional lacquer raw materials of the kind described above usually tends to increase the risk of producing coatings liable to develop hair-like cracks, so that the proportions of these materials incorporated in the resin solutions should not exceed certain limits.

The resin solutions of the invention can be applied to supports in the usual manner. Thus, they may be applied, for example, with the horizontal or vertical wire lacquering machines customarily used in the industry, which may have felt wipers or floating metal wipers as desired. The baking temperature should be about 300–450° C.

The examples given below illustrate the invention, the parts and percentages being by weight, and the products A and B used in preparing the resin solutions in these examples being prepared as follows:

*Product A1.*—300 parts of a polyglycidyl ether obtainable in known manner from 1 mol of 4:4'-dihydroxy-diphenyl-dimethyl-methane, and about 1.6 mols of epichlorhydrin in the presence of an aqueous solution of caustic soda are dissolved into 72 parts of methylcyclohexanol and 72 parts of 2-methyl-2:4-pentane-diol at 100–130° C. The clear solution is mixed at that temperature with 64 parts (0.44 mol) of adipic acid and 16 parts (0.2 mol) of dicyandiamide, and then the whole is stirred for one hour. Owing to the exothermic reaction the temperature of the reaction mass rises to some extent. After the addition of 224 parts of ortho-cresol and 96 parts of orthodichlorobenzene, the solution is stirred for a further 30 minutes at about 100° C., whereby about 840 parts of a clear highly viscous and practically neutral resin solution are obtained.

If in the above method of preparing product A1, the 0.44 mol of adipic acid is replaced by 0.44 mol of sebacic acid or succinic acid, there is obtained a resin solution which has properties similar to those of product A1. These solutions can be used, instead of product A1, with equal success in the examples given below.

*Product A2.*—A solution of 375 parts of the polyglycidyl ether used for preparing product A1 in 180 parts of cyclohexanol, after addition of 88 parts of adipic acid, is stirred at a temperature of 100–130° C. first for about 30 minutes and then, after the addition of 22 parts of dicyandiamide, for a further 40 minutes. Owing to the exothermic reaction the temperature rises somewhat. The resulting thickly viscous resin solution is stirred for a further 45 minutes and then, after the addition of 35 parts of ethylene glycol monoethyl ether, 100 parts of orthodichlorobenzene and 280 parts of xylenol, stirred for a further hour at about 80° C. There are obtained 1080 parts of a clear highly viscous resin solution.

*Product B1.*—5110 parts (about 35 mols) of adipic acid are esterified with 3703 parts (about 40 mols) of glycerine by heating the mixture at 200–220° C. until the acid number has reached a value of about 12. By the addition of ethylene glycol monoethyl ether to the thickly liquid polyester so obtained a solution is produced having a dry content of about 75 percent.

To 1520 parts of the solution of the polyester are added 560 parts of butanol and 1800 parts of ortho-cresol, and the mixture is heated with 1200 parts of a butyl alcoholic solution of about 75 percent strength of a urea-formaldehyde condensation product etherified with butanol for 2½ hours at about 120° C. The clear solution of the modified polyester so obtained has a dry content of about 40 percent.

*Product B2.*—The procedure is analogous to that described for the preparation of product B1, except that, instead of the urea-formaldehyde condensation product etherified with butanol, there is used for modifying the polyester a melamine-formaldehyde condensation product etherified with butanol.

*Product B3.*—152 parts of the solution of 75 percent strength of the polyester such as is used for preparing product B1 are heated with 168 parts of a solution of 50 percent strength of a hardenable condensate obtained from para-tertiary butyl-phenol and formaldehyde in cyclohexanol and with 180 parts of ortho-cresol for 2 hours at 115–120° C. The clear brown solution of the modified polyester so obtained has a dry content of about 40 percent.

*Product B4.*—118 parts (1 mol) of succinic acid and 438 parts (3 mols) of adipic acid are esterified with 424 parts (4.6 mol) of glycerine at 180–225° C. until the acid number has reached a value of about 14.

113 parts of the thickly liquid polyester so obtained are dissolved in 57 parts of butanol and 180 parts of xylenol. After the addition of 150 parts of a butyl alcoholic solution of about 60 percent strength of a tetramethylol-benzoguanamine butyl ether, the mixture is heated for 2 hours at about 115° C. The clear solution of the modified polyester so obtained has a dry content of about 40 percent.

*Product B5.*—229 parts (2 mols) of adipic acid, 118 parts (1 mol) of succinic acid and 202 parts (1 mol) of sebacic acid are esterified with 62 parts (1 mol) of ethylene glycol and 368 parts (4 mol) of glycerine at 190–250° C. until the acid number has reached a value of about 6. The polyester so obtained is a clear thickly liquid resin.

228 parts of this polyester are dissolved in 60 parts of butanol and 60 parts of ethylene glycol monoethyl ether, and, after the addition of 228 parts of a butyl alcoholic solution of 75 percent strength of a melamine-formaldehyde condensation product etherified with butyl alcohol and 384 parts of ortho cresol, the whole is heated for 2 hours at about 100° C. while stirring. The solutions of the modified polyester so obtained has a dry content of about 40 percent.

*Product B6.*—606 parts (3 mols) of sebacic acid and 148 parts (1 mol) of phthalic anhydride are esterified with 460 parts (5 mols) of glycerine at 170–255° C. until the acid number reaches a value of about 8.

113 parts of the polyester so obtained are dissolved in 72 parts of butanol and, after the addition of 115 parts of a butyl alcoholic solution of about 75 percent strength of a melamine-formaldehyde condensation product etherified with butanol, the whole is stirred with slight warming for about 30 minutes. There is obtained a clear light yellowish resin solution having a dry content of 40 percent.

*Product B7.*—584 parts (4 mols) of adipic acid are esterified with 368 parts (4 mols) of glycerine and 95 parts (0.7 mol) of pentaerythritol by heating the mixture at 200–220° C. By the addition of ethylene glycol monoethyl ether there is obtained a solution having a dry content of 75 percent.

To 304 parts of this solution of the polyester there are added 112 parts of butanol, 360 parts of cresol and 224 parts of a butyl alcoholic solution of 75 percent strength of a melamine-formaldehyde condensation product etherified with butanol, and the mixture is heated for 1¼ hours at 100–120° C. The resulting clear solution of the modified ester of medium viscosity has a dry content of 40 percent.

*Example 1*

A mixture of 160 parts of product A1, 105 parts of product B1 and 35 parts of ethylene glycol monoethyl ether is heated for one hour at 100° C., while stirring. The resulting resin solution has a dry content of about 40 percent and can be diluted with the usual lacquer solvents to form a lacquer ready for use.

By baking several layers of such a lacquer at 300–450° C. for example on copper wire, an extensible and excellently adherent insulation is produced having high dielectric properties, and which insulation, even after prolonged heating at 140° C., exhibits no embrittlement and forms no hair-like cracks in contact with solvents.

*Example 2*

A mixture of 180 parts of product A2, 90 parts of product B5 and 30 parts of ethylene glycol monoethyl ether is stirred for 45 minutes with gentle heating.

The resin solutions so obtained, after being diluted with the usual lacquer solvents and baked on copper wire, yields a very flexible insulation, which adheres well and has great resistance to heat, and does not exhibit the formation of hair-like cracks in contact with solvents.

*Example 3*

A mixture of 270 parts of product A1, 135 parts of product B6 and 45 parts of ethylene glycol monoethyl ether is heated for 45 minutes at 110° C. while stirring. The clear solution so obtained has a dry content of about 40 percent and a viscosity of about 12,000 centipoises.

The resin solution can be used for lacquering copper wire with the use of an ordinary wire lacquering machine having floating wipers. After being baked the coating has the same properties as the insulation produced with the resin solution of Example 2.

By using in this example 135 parts of product B4, instead of 135 parts of product B6, the resin solution so obtained yields an insulation having similar properties.

*Example 4*

A solution of 400 parts of product A1, 45 parts of the polyester used for preparing product B4 and having an acid number of about 14, and 71 parts of ethylene glycol monoethyl ether is stirred for 10 minutes at room temperature with a solution consisting of 32 parts of a hardenable phenol-formaldehyde condensation product, 80 parts of xylene, 16 parts of cyclohexanol and 96 parts of orthocresol. The resin solution so obtained is then filtered.

There are obtained with this lacquer, after baking it on metallic supports, coatings which are free from hair-like cracks.

*Example 5*

A mixture of 320 parts of product A1 and a solution consisting of 210 parts of product B3 and 70 parts of ethylene glycol monoethyl ether, is stirred for one hour at 110° C. The clear resin solution so obtained, which has a weakly acid character, has a dry content of about 40 percent and a viscosity of about 5000 centipoises.

After diluting the solution with the usual lacquer solvents and baking, there are obtained flexible insulating coatings which do not form hair-like cracks in contact with solvents.

*Example 6*

A mixture of 200 parts of product A1, 90 parts of product B2 and a solution consisting of 5 parts of a hardenable cresol formaldehyde condensation product, 3 parts of cyclohexanol and 2 parts of xylene, is heated, after the addition of 80 parts of ethylene glycol monoethyl ether, for 30 minutes at 100° C. while stirring. There is obtained a clear resin solution, which can be diluted with the usual lacquer solvents to form a lacquer ready for use. By baking such a lacquer there is obtained an extensible reddish coating which adheres well and is heat resistant, and remains free from hair-like cracks in contact with solvents.

By replacing in this example product A1 by the same quantity of product A2 and/or by using instead of product B2 the same quantity of product B4, insulating coatings produced with these resin solutions possess practically the same properties.

*Example 7*

A mixture of 200 parts of the resin solution of about 40 percent strength obtained as described in Example 1 and a solution consisting of 6 parts of a highly viscous polyvinyl formal, 5 parts of a hardenable cresol-formaldehyde condensation product and 180 parts of cresol, is stirred at room temperature for 10 minutes, whereby a clear resin solution of medium viscosity is obtained.

After baking this lacquer on wire a highly elastic glossy coating is obtained, which remains free from hair-like cracks in contact with solvents and has an enhanced resistance to abrasion as compared with a coating produced with the resin solution of Example 1.

*Example 8*

120 parts of the resin solution obtained as described in Example 1, 150 parts of cresol and a solution consisting of 83 parts of cresol, 12 parts of polyvinyl formal and 5 parts of a hardenable cresol-formaldehyde condensation product, are mixed together, while stirring, to form a clear solution, and the latter is stirred with 12 parts of a stabilized polyisocyanate, prepared by the additive combination of 3 mols of toluylene di-isocyanate with 1 mol of hexane-triol, dissolved in 18 parts of ethylene glycol monoethyl ether acetate.

The solution has a dry content of about 20 percent and can be used for lacquering wire with the use of a wire lacquering machine having felt wipers. After baking, there is obtained a coating of great surface hardness, which remains free from hair-like cracks in contact with solvents and is distinguished by its especially good dielectric properties, even in a damp atmosphere. Thus, a coating stored in a damp atmosphere exhibits a considerably better tg. δ-value, as compared with that of a coating prepared from a resin solution obtained as described in Example 1 and tested under the same conditions.

Example 9

180 parts of a resin solution obtained as described in Example 1 are mixed with 320 parts of a resin solution consisting of 300 parts of cresol, 12 parts of a polyhexamethylene-adipic acid amide (nylon), 3 parts of a hardenable cresol-formaldehyde condensation product, 3.5 parts of cyclohexanol and 1.5 parts of lead naphthenate. The mixture has a dry content of about 18 percent.

When this resin solution is baked on copper wire there is produced a coating having a dull lustre, which remains free from hair-like cracks in contact with solvents, and has a good resistance to winding and abrasion.

Example 10

Equal parts of the resin solutions obtained as described in Examples 6 and 8 are intimately mixed together.

The insulating coating produced with the resulting resin solution after baking on copper wire has a very good surface hardness, a good gloss and remains free from hair-like cracks in contact with solvents.

What is claimed is:

1. A resin solution suitable for preparing a bakable, very heat resistant coating free from haid-like cracks comprising (A) a reaction product, dissolved in a solvent free from carboxyl groups, from (a) a resinous derivative of a polyhydric polynuclear phenol of which the phenol nuclei are connected together by a carbon bridge, which derivative contains at least two ethylene oxide groups and is obtained by reaction of a chlorhydrin selected from the group consisting of epichlorhydrin and dichlorhydrin on the polyhydric phenol in an alkaline medium and which derivative is present in a quantity containing 1 mol of ground polyhydric phenol, (b) about ⅛ to at most ⅗ of one equivalent of a substance selected from the group consisting of a polybasic carboxylic acid, of which the carboxyl groups are separated from one another by at least two carbon atoms, and an anhydride of such an acid, and (c) about 0.06 to 0.6 mol of dicyandiamide, (B) a polyester containing free hydroxyl groups and prepared from a polyhydric alcohol and a substance as defined under (b) in the proportion of about 1.71 to about 1.875 hydroxyl equivalents to one carboxyl equivalent, and (C) a hardenable formaldehyde condensation product selected from the group consisting of an amino-1,3,5-triazine-formaldehyde condensation product, an alkyl ether of the latter, a urea-formaldehyde condensation product, an alkyl ether of the latter, and a phenol-formaldehyde condensation product, the proportion by weight of components (A):(B) amounting to about 100 parts:22.2–41.36 parts, and the proportion by weight of components (B):(C) amounting to about 100 parts:71.1–132.0 parts.

2. A resin solution according to claim 1, wherein the polyhydric polynuclear phenol is 4:4'-dihydroxydiphenyl-dimethyl-methane.

3. A resin solution according to claim 1, wherein component (C) is a hardenable amino-1,3,5-triazineformaldehyde condensation product.

4. A resin solution according to claim 3, wherein the polyhydric polynuclear phenol is 4:4'-dihydroxydiphenyl-dimethyl-methane.

5. A resin solution according to claim 1, wherein component (C) is an alkyl ether of a hardenable amino-1,3,5-triazine-formaldehyde condensation product.

6. A resin solution according to claim 5, wherein the polyhydric polynuclear phenol is 4:4'-dihydroxydiphenyl-dimethyl-methane.

7. A resin solution according to claim 1, wherein component (C) is an alkyl ether of a hardenable urea-formaldehyde condensation product.

8. A resin solution according to claim 7, wherein the polyhydric polynuclear phenol is 4:4'-dihydroxydiphenyl-dimethyl-methane.

9. A resin solution according to claim 1, wherein component (C) is a hardenable phenol-formaldehyde condensation product.

10. A resin solution according to claim 1, wherein at least two of the components (A), (B) and (C) have been heated together in a solvent free from hydroxyl groups.

11. A resin solution according to claim 10, wherein the polyhydric polynuclear phenol is 4:4'-dihydroxydiphenyl-dimethyl-methane.

References Cited in the file of this patent

UNITED STATES PATENTS 2,637,715    Ott    May 5, 1953

OTHER REFERENCES

"Epon Resins," Paint, Oil & Chemical Review, November 9, 1950, pages 17–18, 48 and 49.

UNITED STATES PATENT OFFICE

CERTIFICATE OF CORRECTION

Patent No. 2,830,965                                  April 15, 1958

Gustav Heinrich Ott

It is hereby certified that error appears in the printed specification of the above numbered patent requiring correction and that the said Letters Patent should read as corrected below.

Column 7, line 44, for "haid-like" read -- hair-like --.

Signed and sealed this 19th day of August 1958.

(SEAL)
Attest:
KARL H. AXLINE
Attesting Officer

ROBERT C. WATSON
Commissioner of Patent